US012506999B2

(12) United States Patent
Li et al.

(10) Patent No.: US 12,506,999 B2
(45) Date of Patent: Dec. 23, 2025

(54) NOISE REDUCING TWS EARPHONE WITH MULTI-SPEAKERS

(71) Applicant: Dongguan Roker Electronics Co., Limited, Dongguan (CN)

(72) Inventors: Keqiang Li, Dongguan (CN); Hua Li, Dongguan (CN)

(73) Assignee: Dongguan Roker Electronics Co., Limited, Dongguan (CN)

( * ) Notice: Subject to any disclaimer, the term of this patent is extended or adjusted under 35 U.S.C. 154(b) by 233 days.

(21) Appl. No.: 18/231,604

(22) Filed: Aug. 8, 2023

(65) Prior Publication Data

US 2025/0016493 A1 Jan. 9, 2025

(30) Foreign Application Priority Data

Jul. 4, 2023 (CN) ........................ 202321747166.0

(51) Int. Cl.
*H04R 1/24* (2006.01)
*H04R 1/10* (2006.01)
*H04R 5/033* (2006.01)
*H04R 9/06* (2006.01)

(52) U.S. Cl.
CPC ............. *H04R 1/24* (2013.01); *H04R 1/1016* (2013.01); *H04R 1/1075* (2013.01); *H04R 5/033* (2013.01); *H04R 9/06* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 4,418,248 A * | 11/1983 | Mathis | H04R 1/26 381/373 |
| 2016/0286302 A1* | 9/2016 | Huang | H04R 17/00 |
| 2024/0348967 A1* | 10/2024 | Wang | H04R 1/1016 |

* cited by examiner

*Primary Examiner* — Fan S Tsang
(74) *Attorney, Agent, or Firm* — Birchwood IP

(57) ABSTRACT

The present disclosure provides a noise reducing TWS earphone with multi-speakers including an earphone body and an earbud; where, an interior of the earphone body is provided with a planar speaker responsible for an intermediate frequency sound and a high frequency sound and a moving-coil speaker responsible for the intermediate frequency sound and a low frequency sound, an interior of the earbud is provided with a moving ironloud-speaker; a center of the planar speaker and a center of the moving-coil speaker are on the same central axis. The design of the present disclosure has reached the international Hires standard and realized an ultra-high bandwidth sound. With an AI adaptive noise reducing design, the sound performance has a stronger integrity, it can better reflect the depth of the sound and generally improve a full audio frequency performance of the earphone, and people can enjoy best sound in various noisy environments.

4 Claims, 4 Drawing Sheets

A-A

NOISE REDUCING TWS EARPHONE WITH MULTI-SPEAKERS

CROSS-REFERENCE TO RELATED APPLICATIONS

This is a U.S. patent application which claims the priority and benefit of Chinese Patent Application Number 202321747166.0, filed on Jul. 4, 2023, the disclosure of which is incorporated herein by reference in its entirety.

TECHNICAL FIELD

The present disclosure relates to the field of earphone technologies, and in particular, to a noise reducing TWS earphone with multi-speakers.

BACKGROUND

Most existing TWS (true wireless stereo) earphones use a moving-coil speaker, and some earphones use a single moving-coil speaker and a high frequency moving-coil speaker. A large moving-coil speaker has a good performance in an intermediate frequency sound and a low frequency sound and a bad performance in a high frequency sound. Using the high-frequency moving-coil speaker to compensate for the high frequency sound, a range of the sound that can be reached is limited and cannot meet the Sony high-definition audio Hires standard.

To this end, a noise reducing TWS earphone with multi-speakers is proposed.

SUMMARY

In view of this, an embodiment of the present disclosure aims to provide a noise reducing TWS earphone with multi-speakers to solve or alleviate a technical problem existing in the prior art, and at least provide a beneficial choice.

The technical solution of the embodiment of the present disclosure is implemented as follows: a noise reducing TWS earphone with multi-speakers including an earphone body and an earbud;

- where, an interior of the earphone is provided with a planar speaker responsible for an intermediate frequency sound and a high frequency sound and a moving-coil speaker responsible for the intermediate frequency sound and a low frequency sound, and an interior of the earbud is provided with a moving ironloud-speaker responsible for an ultrahigh frequency sound;
- a center of the planar speaker and a center of the moving-coil speaker are on the same central axis.

In an embodiment, the earbud is provided on the earphone body.

In an embodiment, an outside of the earbud is sleeved with an earphone cap.

In an embodiment, the moving ironloud-speaker is a dual-moving ironloud-speaker.

In an embodiment, the moving ironloud-speaker is a tri-moving ironloud-speaker.

As the above technical solution are used in the embodiment of the present disclosure, and the present disclosure has the following benefits:

- the design of the present disclosure has reached the international Hires standard and realized an ultra-high bandwidth sound. With an AI (Artificial Intelligence) adaptive noise reducing design, the sound performance has a stronger integrity, it can better reflect the depth of the sound and generally improve a full audio frequency performance of the earphone, so that people can enjoy best sound in various noisy environments.

The above description is only for a purpose of explaining the present disclosure and is not intended to be limited in any way. In addition to an exemplary aspect, implementation mode, and feature described above, further aspects, implementation modes, and features of the present disclosure will be easily understood by referring to the drawings and the following detailed description.

BRIEF DESCRIPTION OF DRAWINGS

In order to provide a clearer explanation of the technical solution of the embodiment of the present disclosure or technical solution in the prior art, a brief introduction will be given to the drawing required in the description of the embodiment or the description of the prior art. It is obvious that the drawings in the following description are only some drawings of the present disclosure. For ordinary technical personnel in the art, other drawings can be obtained based on these drawings without any creative work.

Figure 1:
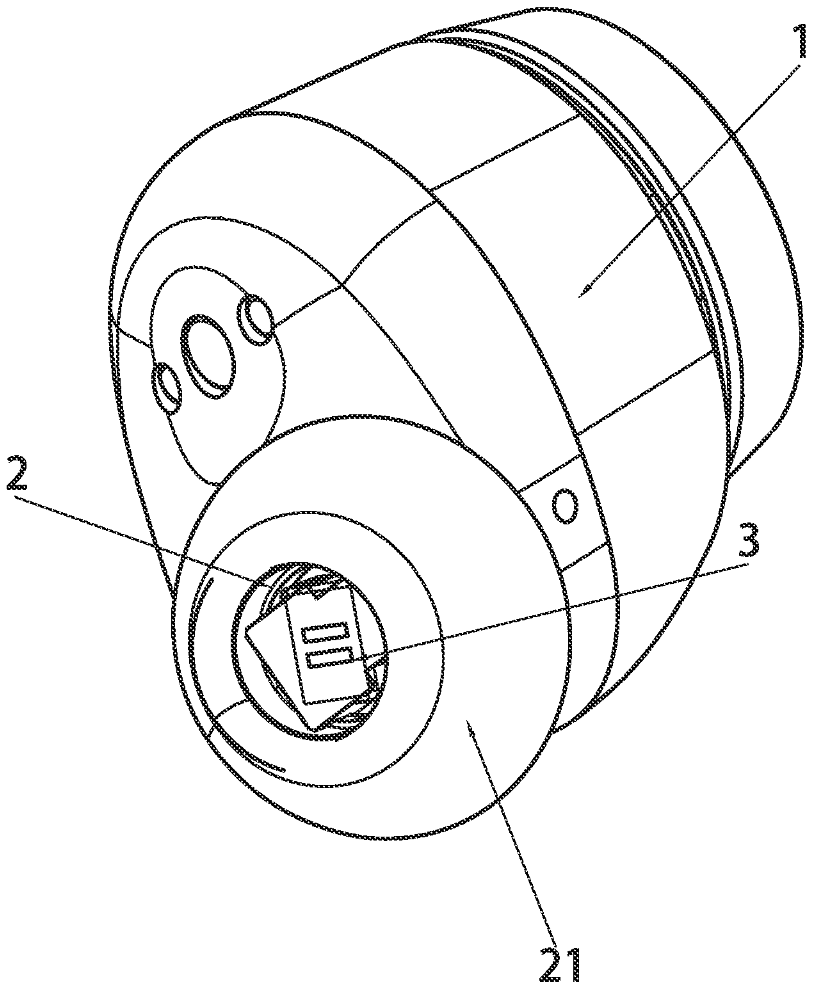
FIG. 1 is a structural diagram of a noise reducing TWS earphone of an embodiment of the present disclosure from one perspective.

Number references: 1. Earphone body; 2. Earbud; 21. Earphone cap; 3. Moving ironloud-speaker; 4. Planar speaker; 5. Moving-coil speaker.

DETAILED DESCRIPTION

In the following description, only some exemplary embodiments have been briefly described. As those skilled in the art may recognize, the described embodiments can be modified in various ways without departing from the spirit or scope of the present disclosure. Therefore, the drawings and descriptions are considered essentially exemplary rather than limitation.

It should be noted that terms "first", "second", "symmetrical", "array", etc. are only used for a purpose of distinguishing description or a positional description, and cannot be understood as indicating or implying a relative importance or implying the quantity of technical feature indicated. Therefore, those features defined as "first" and "symmetrical" can explicitly or implicitly include one or more features; similarly, when there is no quantitative restriction on a certain feature in a form of wording such as "two" or "three", it should be noted that the feature also explicitly or implicitly includes one or more features.

In the present disclosure, unless otherwise specified and limited, terms "installation", "connection", "fixation", etc. should be understood broadly; for example, it can be a fixed connection, a detachable connection, or an integrated molding; it can be a mechanical connection, a direct connection, a welding connection, or an indirect connection through an intermediate medium; it can be an internal connection between two components or an interaction relationship between two components. For ordinary technical personnel in the art, a specific meaning of the above term in the present disclosure can be understood based on the drawing of the present disclosure and a specific circumstance.

The following is a detailed explanation of the embodiment of the present disclosure in combination with the drawing.

Figure 2:
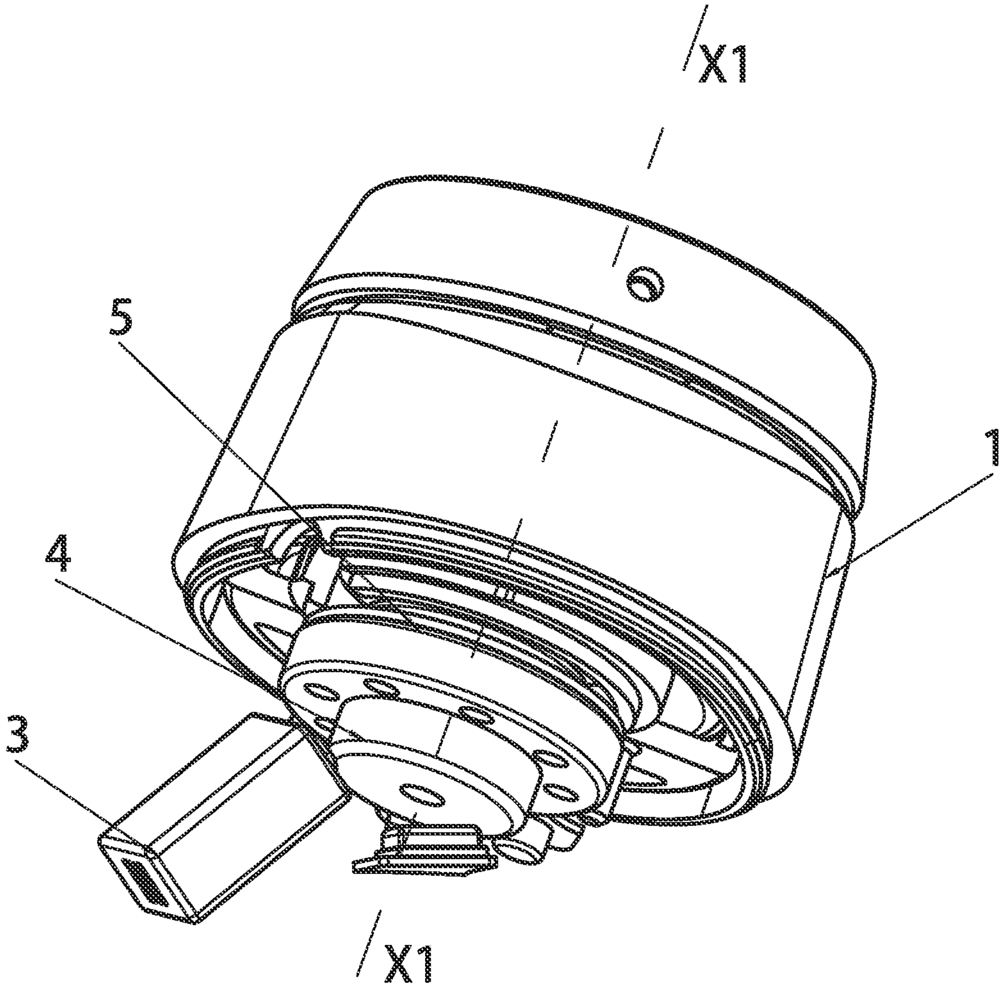
FIG. 2 is a structural diagram of the noise reducing TWS earphone without an earbud of an embodiment of the present disclosure.
Figure 3:
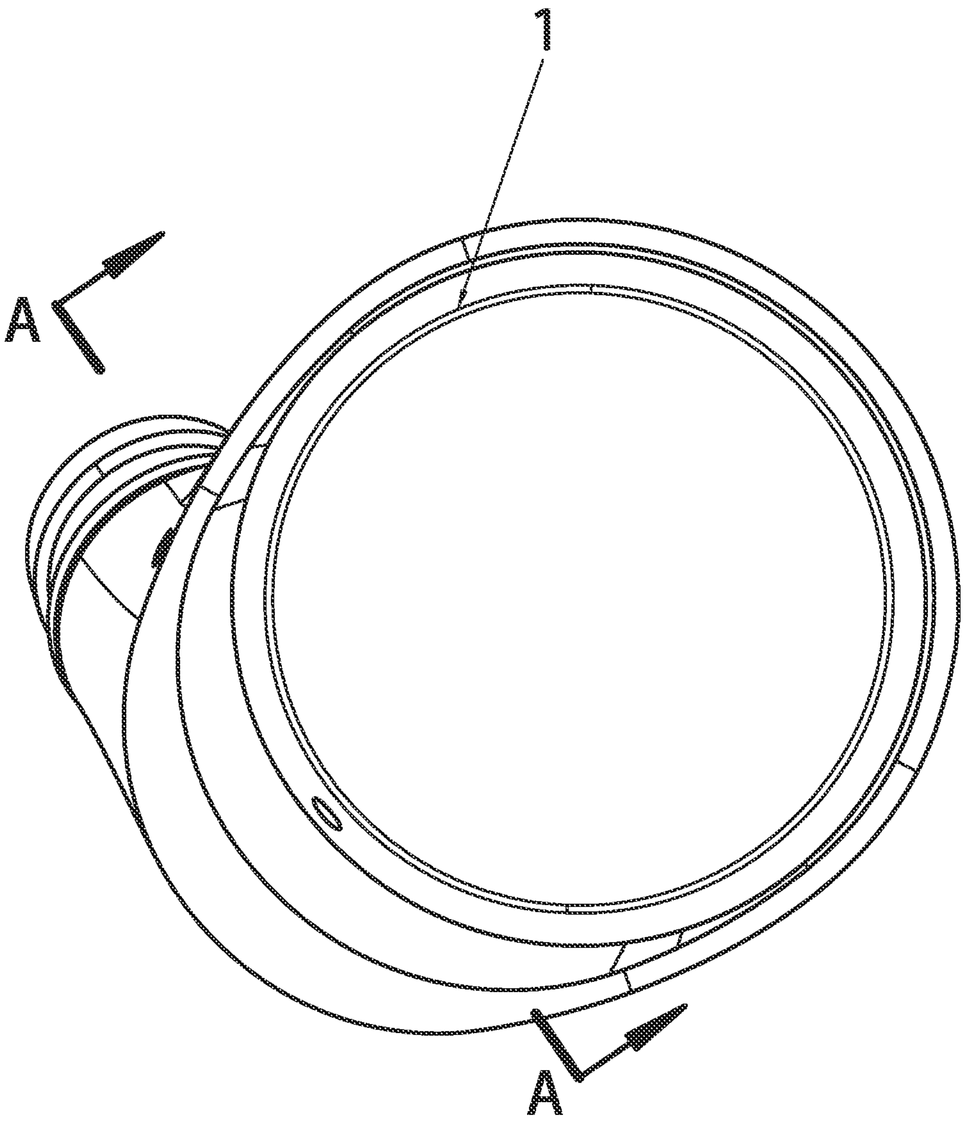
FIG. 3 is a structural diagram of the noise reducing TWS earphone of an embodiment of the present disclosure from another perspective.
Figure 4:
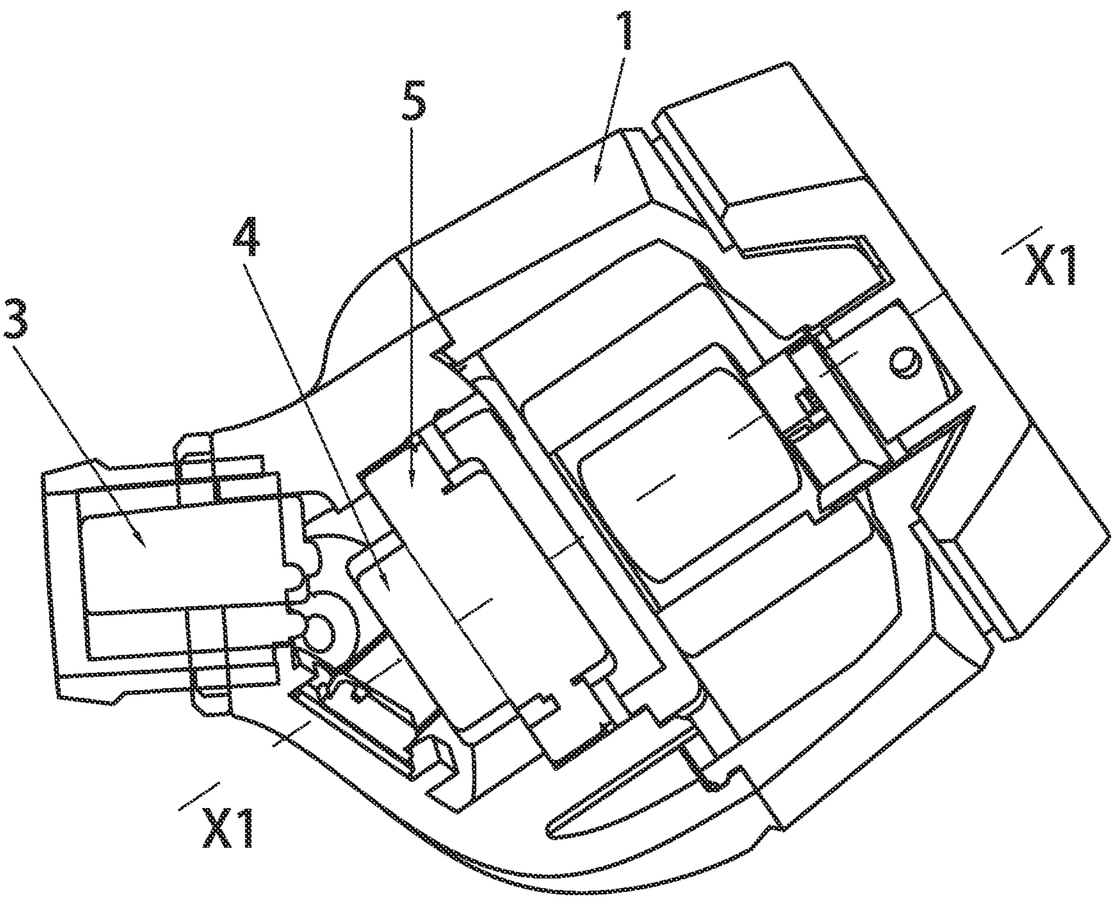
FIG. 4 is a A-A cross-sectional structural diagram of the noise reducing TWS earphone of an embodiment of the present disclosure.

As shown in FIGS. 1-4, the embodiment of the present disclosure provides a noise reducing TWS earphone with multi-speakers, which includes an earphone body 1 and an earbud 2;

where, an interior of the earphone body 1 is provided with a planar speaker 4 responsible for an intermediate frequency sound and a high frequency sound and a moving-coil speaker 5 responsible for the intermediate frequency sound and a low frequency sound, and an interior of the earbud 2 is provided with a moving ironloud-speaker responsible for an ultrahigh frequency sound;

where, a center of the planar speaker 4 and a center of the moving-coil speaker 5 are on the same central axis, the central axis "X1-X1" is shown in FIG. 2 and FIG. 4. The noise reducing TWS earphone of the present disclosure is arranged in a coaxial manner, that is, the moving-coil speaker 5 and the planar speaker 4 (the planar speaker 4 exhibiting the high frequency sound is better than the moving-coil speaker 5 exhibiting the high frequency sound) are superimposed on the same axis. Thus, the sound performance has a stronger integrity, and can reflect the depth of the sound.

In an embodiment, specifically, the earbud 2 is provided on the earphone body 1 for inserting it into an ear of a person.

In an embodiment, specifically, an outside of the earbud 2 is sleeved with an earphone cap 21. Which is used to provide a cushioning effect and improve comfort when inserting the earbud 2 into the ear of a person.

In an embodiment, specifically, the moving ironloud-speaker 3 is a dual-moving ironloud-speaker. Then a design of arranging four speakers on the same axis is used, the moving-coil speaker is responsible for the intermediate frequency sound and the low frequency sound, and the planar speaker is responsible for the intermediate frequency sound and the high frequency sound, the dual-moving ironloud-speaker is responsible for the ultrahigh frequency sound. Thus, the sound is combined through a filtering design of two frequency dividing circuits to achieve an ultrahigh frequency range of 40 KHZ.

Optionally, the moving ironloud-speaker 3 is a tri-moving ironloud-speaker. Then a design of arranging five speakers on the same axis is used, the moving-coil speaker is responsible for the intermediate frequency sound and the low frequency sound, and the planar speaker is responsible for the intermediate frequency sound and the high frequency sound, the tri-moving ironloud-speaker is responsible for the ultrahigh frequency sound. Thus, the sound is combined through a filtering design of two frequency dividing circuits to achieve an ultrahigh frequency range of 40 KHZ.

When the noise reducing TWS earphone of the present disclosure is in operation, compared with the earphone with a single moving-coil speaker in the market, the design of the present disclosure has reached the international Hires standard and realized an ultra-high bandwidth sound. With an AI adaptive noise reducing design, the sound performance has a stronger integrity, it can better reflect the depth of the sound and generally improve a full audio performance of the earphone, so that people can enjoy best sound in various noisy environments.

The above description is only a specific implementation mode of the present disclosure, but the protection scope of the present disclosure is not limited to this. Any technical personnel familiar with the technical field can easily think of various changes or substitutions within the technical scope disclosed by the present disclosure, which should be covered within the protection scope of the present disclosure. Therefore, the protection scope of the present disclosure should be based on the protection scope of the claims.

What is claimed is:

1. A noise reducing TWS earphone with multi-speakers, comprising an earphone body and an earbud;

wherein, an interior of the earphone body is provided with a planar speaker responsible for an intermediate frequency sound and a high frequency sound and a moving-coil speaker responsible for the intermediate frequency sound and a low frequency sound, and an interior of the earbud is provided with a moving ironloud-speaker responsible for an ultrahigh frequency sound;

a center of the planar speaker and a center of the moving-coil speaker are on the same central axis;

wherein the moving ironloud-speaker is a dual-moving ironloud-speaker.

2. The noise reducing TWS earphone with multi-speakers according to claim 1, wherein the earbud is provided on the earphone body.

3. The noise reducing TWS earphone with multi-speakers according to claim 1, wherein an outside of the earbud is sleeved with an earphone cap.

4. The noise reducing TWS earphone with multi-speakers according to claim 1, wherein the moving ironloud-speaker is a tri-moving ironloud-speaker.

* * * * *